Aug. 11, 1936.  G. B. STARIE  2,050,863
MOTOR DRIVEN SYSTEM
Filed June 28, 1935
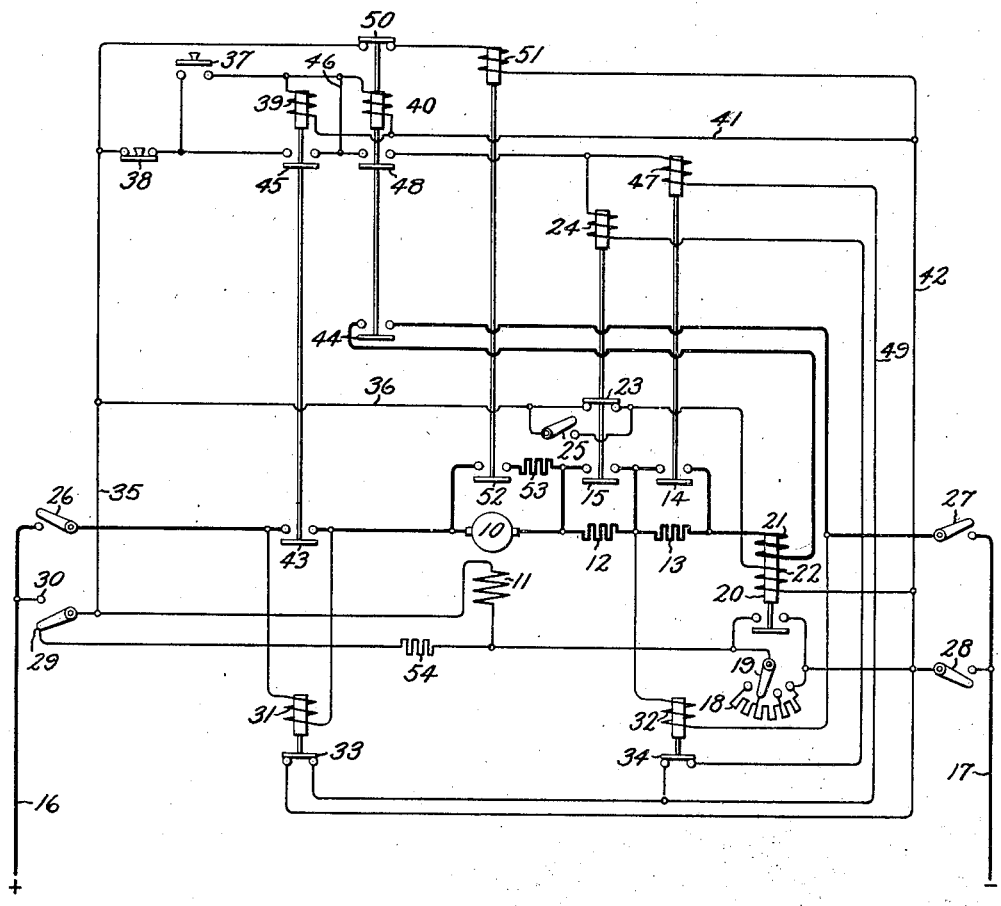
Inventor:
George B. Starie,
by Harry E. Dunham
His Attorney.

Patented Aug. 11, 1936

2,050,863

UNITED STATES PATENT OFFICE 2,050,863

MOTOR DRIVEN SYSTEM

George B. Starie, Schenectady, N. Y., assignor to General Electric Company, a corporation of New York Application June 28, 1935, Serial No. 28,813

7 Claims. (Cl. 172—179)

My invention relates to systems of motor control and has for its object the provision of simple and reliable means for controlling the acceleration and deceleration of an electric motor.

My invention has particular application in the control of motors which are decelerated from the normal running speed to a predetermined relatively low base speed for operation temporarily to provide for a threading or other operation in connection with the apparatus being driven by the motor, after which the motor is accelerated again to the normal running speed. An example of such an application is afforded by a motor connected to drive a reel for winding up cold steel strip in a steel mill.

More particularly, my invention relates to means for controlling the rate of change of speed of the motor to give the maximum rates of acceleration and deceleration, especially between the base speed and the running speed, consistent with the current carrying capacity of the motor. A common way of accomplishing this is by controlling the field resistance, and hence excitation, of the motor automatically in response to the motor armature current so as to limit the armature current to a predetermined maximum value which the armature can carry without damage.

Heretofore, however, a plurality of relays have been used for controlling the field resistance in the correct manner to obtain the desired control of the armature current. One reason for the use of a plurality of relays, with consequent complications, is the fact that the required control of the field resistance during acceleration is just the opposite of that required during deceleration. In other words, during acceleration the controlling resistance is normally in the field circuit, but is reduced or short circuited to reduce the armature current. During deceleration, on the other hand, the controlling resistance is normally reduced or short circuited and is reinserted in the field circuit to reduce the armature current.

In accordance with my invention I provide a single relay for controlling the field resistance in a desired manner during both acceleration and deceleration. More particularly, I provide a normally open relay or switch which when closed short circuits the field resistance, together with two operating windings or coils for this switch, one of which is included in the armature circuit of the motor while the other is a shunt coil. The shunt coil is deenergized during acceleration, or at least during that portion of the acceleration over which field control is required to limit the armature current, whereby the series coil closes the switch upon the occurrence of an excessive armature current to thereby decrease the current. During periods of deceleration coupled with the regeneration of power back into the supply circuit, the shunt coil is energized and maintains the switch normally closed, whereby the resistance is short circuited. However at that time the series coil opposes the shunt coil and, in case of excessive armature current, causes the switch to open and reinsert the resistance.

For a more complete understanding of my invention reference should be had to the accompanying drawing, the single figure of which is a diagrammatical illustration of a system of motor control embodying my invention.

Referring to the drawing, I have shown my invention in one form as applied to a direct current motor provided with an armature 10 and a shunt field 11. The motor is started with starting resistances 12 and 13 included in circuit with the armature 10, these resistances being respectively short circuited in sequence by means of switches 14 and 15, the resistance 13 being short circuited first. As shown, energy is supplied to the motor from suitable direct current supply means 16 and 17.

The final running speed of the motor can be adjusted by means of a manually operated rheostat 18 included in the circuit with the field winding 11. This rheostat is provided with a pivoted operating arm 19 which selectively cooperates with tap contacts connected with various points of the rheostat. Obviously however any suitable rheostat may be used. It is contemplated that the rheostat will be adjusted to give a predetermined field excitation which in turn will give the desired maximum motor speed after the resistances 12 and 13 have been short circuited.

For the purpose of limiting the current in the armature of the motor to a predetermined maximum value which the armature can carry without damage, I have provided a switch or relay 20 which is normally open as shown, and which when closed short circuits the rheostat 18. This switch is operated by means of two coils, a series coil 21 in the armature circuit of the motor, and a shunt coil 22 which is energized from the supply mains. The shunt coil 22 is arranged when energized to close the switch 20 and hold it closed without assistance from the coil 21 although, as will be hereinafter explained, during regeneration when the coil 21 is bucking, the coil 22 is energized. While the motor is operating as a motor, however, the coil 21 is energized in a direction to assist the coil 22 in holding the switch 20 closed, i. e., the two coils are accumulative with respect to each other.

During the initial steps in the starting of the motor the shunt coil is energized and the rheostat 18 is therefore short circuited. However, when the last starting resistance, section 12, is short circuited by the switch 15, an interlock switch 23 in circuit with the shunt coil 22 is opened, whereby the shunt coil 22 is deenergized. It will be observed that the two switches 15 and 23 are operated by an operating coil 24. Upon deenergization of the coil 22 the switch 20 opens, assuming that the armature current is below the predetermined maximum value at which the series coil 21 closes the switch.

The deenergization of the coil 22 by the opening of the switch 23 thus turns over the control of the switch 20 entirely to the series coil 21 for further acceleration of the motor to the maximum speed selected by adjustment of the rheostat 18. Thereafter, in the event of an excessive armature current the coil 21 closes the switch and short circuits the rheostat 18. This increases the motor field and thereby reduces the armature current. When the armature current has been reduced to a value somewhat below the predetermined value for which the coil 21 is arranged to close the switch, the switch drops open in accordance with its bias, which may be either gravity or a spring. This reinsertion of the resistance in the field circuit causes the motor to continue its acceleration at the higher rate. As a result, the armature current may again become excessive. It is contemplated that the switch 20 will be momentarily opened and closed with a vibrating or fluttering action, with the result that the motor is accelerated with maximum armature current and hence at the greatest possible rate to the high running speed corresponding with the adjustment of the rheostat 18.

In the event now that it is desired to operate the motor perhaps temporarily at the materially lower base speed at which the motor operates when the rheostat 18 is short circuited, the shunt coil 22 is energized to close the switch 20 and thereby short circuit the rheostat. This is done by closing manually an auxiliary switch 25 in parallel with the switch 23.

The motor is now decelerated quickly by regenerative braking to the base speed. As previously indicated, however, the current in the coil 21 which is now reversed, since the motor is operating as a generator, is in a direction to generate a flux which opposes the flux produced by the coil 22. The coils are furthermore so arranged relatively that when the armature regenerative current reaches the predetermined maximum current, the coil 21 overcomes the effect of the coil 22 in holding the switch 20 closed to such extent that the switch drops open in accordance with its bias, thereby reinserting the rheostat 18 in the field circuit. The switch will be momentarily opened and closed with a fluttering action to hold the current at a safe value, and thereby decelerate the motor at the maximum possible rate to the predetermined low base speed.

When it is desired to again operate the motor at the maximum or running speed, the switch 25 is opened, whereupon the motor accelerates quickly to the running speed as previously described. Thus, by means of the switch 25, the motor speed can be changed promptly from high to low, and vice versa. The low or base speed is of course suitably selected, as by the design of the motor itself, while the high speed is selected by adjustment of the rheostat 18.

The operation of the complete system embodying my invention as shown in the drawing will now be described in detail.

Assuming that the motor is at rest and the motor and control devices entirely deenergized, the various switches will be in the positions indicated diagrammatically in the drawing. Preliminary to the starting of the motor, the power switches 26 and 27 are closed, the switch 28 in the control circuit is closed, and the field switch 29 is moved to its uppermost position into engagement with the contact 30. It will be understood that the switches 26 and 27 may and probably will be constituted by a single throw double-pole switch, although separate switches are shown in the drawing for purposes of clarity.

The closing of the switches 26 and 27 completes a control circuit from the supply main 16, through the switch 26, the voltage coil 31, the armature 10, resistance 12, the voltage coil 32, and the switch 27 to the main 17. The coils 31 and 32 thereupon open their respective switches 33 and 34, these switches being later closed in sequence to effect the short circuiting of the starting resistances 12 and 13 as will be presently described. A circuit for the field winding 11 is completed by the closing of the switch 28 and the operation of the switch 29 to its upper position, and also a circuit for the shunt coil 22, this latter circuit leading from main 16 through switch 29, conductors 35 and 36, switch 23, the coil 22 and switch 28 to the main 17. The shunt coil immediately closes the switch 20 whereby full field is applied to the motor.

The motor may now be started by pressing the normally open start push button 37 whereby a circuit is completed from the supply main 16 through switch 29, conductor 35, the normally closed stop push button 38, the push button 37, coils 39 and 40 in parallel, conductors 41, 42, and switch 26 to the supply main 17. The coils 39 and 40 immediately close the two switches 43 and 44 in the armature circuit of the motor. At the same time a holding circuit is established for the coils 39 and 40 by means of a switch 45, closed by the coil 39, and a conductor 46.

The motor now starts and begins to accelerate. It will be noted that the closing of the switch 43 short circuits the coil 31. The coil 31 is so arranged with respect to its number of turns, resistance, and its relation to its armature, that the coil when short circuited holds the switch 33 open by its self-induction for a predetermined time interval, such as several seconds, after which the switch 33 closes in accordance with its bias. This time delay switching device or relay may be of the type described and claimed in my Patent No. 1,919,991, dated July 25, 1933.

A circuit is established by the switch 33 for the coil 47 whereby the coil closes its switch 14 thereby short circuiting the starting resistance 13. This circuit may be traced from the conductor 35 through the stop push button 38, switch 45, switch 48 closed with the switch 44, the coil 47, conductor 49, and switch 33 to the supply main 17. The motor now accelerates to its next higher speed.

It will be noted that the closing of switch 14 also short circuits the coil 32 which is connected across the resistance 13 and after an inductive time interval the switch 34 closes a circuit for the coil 24 in parallel with the coil 47. It will be understood that the timing relay 32, 34 is similar in construction and operation to the relay 31, 33. The coil 24 closes the switch 15 thereby short circuiting the last starting resistance 12 and also opens the switch 23 whereby the shunt coil 22 is deenergized. It will be understood that the motor continues to accelerate to the speed corresponding to the setting of the rheostat 18, the armature current, and hence rate of acceleration, being limited to a safe value by the series coil 21 and switch 20.

If it any time it is desired to reduce the running speed of the motor to the low base speed, this may be done as previously described by closing the auxiliary switch 25.

In order to stop the motor, the stop button 38 is pressed whereby the coils 39 and 40 are deenergized and the switches 43 and 44 thereby opened. The opening of the switch 44 closes the interlock switch 50 which establishes a circuit for a coil 51. This coil 51 closes its switch 52 thereby connecting a dynamic braking resistance 53 across the armature 10. The motor is thereupon dynamically braked to rest. As shown, when the switch 29 is thrown to its lowermost position to deenergize the field winding 11, it establishes a discharge circuit for the field winding through the resistance 54.

What I claim as new and desire to secure by Letters Patent of the United States, is:—

1. The combination with an electric motor provided with armature and field circuits, of a resistance in said field circuit, a normally open field switch for short circuiting said resistance, a series operating coil for said switch connected in said armature circuit for controlling the short circuiting of said resistance during acceleration and regenerative deceleration of said motor so as to limit the current in said armature circuit to a predetermined value, a normally energized shunt coil for said switch arranged to oppose said series coil during regenerative operation of said motor, said shunt coil being arranged when energized to close said switch, and means for deenergizing said shunt coil during acceleration of said motor whereupon said motor accelerates under the control of said series coil.

2. The combination with an electric motor provided with armature and field circuits, of a resistance in said field circuit, a normally open field switch for short circuiting said resistance, a series operating coil for said switch connected in said armature circuit for controlling the short circuiting of said resistance during acceleration and regenerative deceleration of said motor so as to limit the current in said armature circuit to a predetermined value, a shunt coil for said switch, said shunt coil being normally energized to close said switch when the motor is accelerating, and means responsive to the acceleration of said motor for deenergizing said shunt coil.

3. The combination with an electric motor provided with armature and field circuits, of a resistance in said field circuit, a normally open switch for short circuiting said resistance, a pair of cooperating series and shunt coils for operating said switch, said series coil being connected in said armature circuit and said shunt coil being normally energized to close said switch, means for deenergizing said shunt coil during the starting of the motor whereby said switch is controlled by said series coil to limit the armature current to a predetermined value, and auxiliary means for energizing said shunt coil to close said switch during the operation of said motor whereupon said motor is regeneratively braked to a lower operating speed.

4. The combination with an electric motor provided with armature and field circuits, of a resistance in said field circuit, a normally open control switch for short circuiting said resistance, a pair of cooperating series and shunt coils for operating said switch to short circuit said resistance, said series coil being connected in said armature circuit, switch means in the circuit of said shunt coil, means responsive to the acceleration of the motor for opening said switch means to deenergize said shunt coil, whereupon said control switch is operated by said series coil to control the acceleration of said motor to a speed corresponding to the amount of said resistance, and auxiliary switching means for closing the circuit of said shunt coil for regenerative deceleration of said motor to a lower running speed.

5. The combination with an electric motor provided with armature and field circuits, of a resistance in said field circuit, a normally open field switch for short circuiting said field resistance, a series operating coil for said switch connected in said armature circuit for controlling the short circuiting of said field resistance during acceleration and regenerative deceleration of said motor so as to limit the current in said armature circuit to a predetermined value, a starting resistance in said armature circuit, switching means for short circuiting said starting resistance to accelerate said motor, timing means for controlling said switching means, a shunt coil for said field switch, said shunt coil being normally energized to close said field switch, and means responsive to the operation of said switching means to short circuit said starting resistance for deenergizing said shunt coil whereby said field switch is operated by said series coil to control the current in said armature circuit during continued acceleration of the motor to a speed corresponding to the value of said field resistance.

6. The combination with an electric motor provided with armature and field circuits, of a rheostat in said field circuit, means for adjusting said rheostat to predetermine the final speed of the motor, a normally open field switch for short circuiting said rheostat, a pair of cooperating series and shunt coils for operating said field switch, said series coil being connected in said armature circuit and said shunt coil being normally energized to close said field switch, a starting resistance in said armature circuit, means for short circuiting said starting resistance a predetermined time interval after the starting of the motor, and means operated by said short circuiting means for deenergizing said shunt coil whereupon said field switch is operated by said series coil to control the acceleration of said motor to said final speed, and auxiliary means for energizing said shunt coil for regenerative deceleration of said motor to a lower base speed corresponding to the field energization of said motor when said rheostat is short circuited.

7. The combination with a motor provided with a field circuit of a starting resistance therefor, of means for short circuiting said resistance to accelerate said motor, a rheostat in said field circuit, a current responsive relay for controlling a short circuit around said rheostat, a normally energized shunt coil for said relay, said coil acting accumulatively to hold said relay closed during acceleration of said motor, means operated by said resistance short circuiting means for deenergizing said shunt coil whereupon the motor is accelerated under the control of said relay to a maximum speed with said rheostat in said field circuit, and auxiliary means for energizing said shunt coil whereupon said motor is decelerated to a base speed with said rheostat short circuited.

GEORGE B. STARIE.